(12) United States Patent
Preisner et al.

(10) Patent No.: US 8,321,106 B2
(45) Date of Patent: Nov. 27, 2012

(54) DETERMINING AN ENGINE TORQUE ERROR DURING AN ENGINE TORQUE INTERVENTION

(75) Inventors: Marian Preisner, Buehl (DE); Juergen Benz, Oberkirch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1122 days.

(21) Appl. No.: 12/214,152

(22) Filed: Jun. 17, 2008

(65) Prior Publication Data
US 2009/0012683 A1    Jan. 8, 2009

(30) Foreign Application Priority Data
Jun. 18, 2007   (DE) .......................... 10 2007 027 904

(51) Int. Cl.
*B60W 10/02* (2006.01)

(52) U.S. Cl. ........................................... 701/67; 701/51
(58) Field of Classification Search .................. 701/29, 701/31, 34, 67, 36, 51, 68, 29.1, 34.4; 477/175
See application file for complete search history.

(56) References Cited

U.S. PATENT DOCUMENTS

| | | | | |
|---|---|---|---|---|
| 5,103,692 A * | 4/1992 | Shimanaka et al. | | 477/109 |
| 5,515,281 A * | 5/1996 | Palazzetti et al. | | 701/111 |
| 5,679,099 A * | 10/1997 | Kato et al. | | 477/176 |
| 5,752,894 A * | 5/1998 | Fischer | | 477/169 |
| 5,833,570 A * | 11/1998 | Tabata et al. | | 477/3 |
| 7,144,350 B2 * | 12/2006 | Maxon et al. | | 477/107 |
| 7,544,150 B2 * | 6/2009 | Trush et al. | | 477/120 |
| 2002/0111731 A1 | 8/2002 | Jain et al. | | 701/56 |
| 2005/0079952 A1 * | 4/2005 | Maxon et al. | | 477/107 |
| 2006/0021807 A1 * | 2/2006 | Andersen et al. | | 180/65.2 |
| 2006/0080019 A1 * | 4/2006 | Eich et al. | | 701/51 |
| 2008/0032858 A1 * | 2/2008 | Frank et al. | | 477/37 |
| 2009/0156356 A1 * | 6/2009 | Jiang | | 477/86 |
| 2009/0186743 A1 * | 7/2009 | Fodor et al. | | 477/86 |
| 2010/0105523 A1 * | 4/2010 | Hrovat et al. | | 477/175 |

FOREIGN PATENT DOCUMENTS

DE     41 18 736 A1     12/1991

* cited by examiner

*Primary Examiner* — Dalena Tran
*Assistant Examiner* — Jason Holloway
(74) *Attorney, Agent, or Firm* — Davidson, Davidson & Kappel, LLC

(57) ABSTRACT

A method for determining an error in engine torque, wherein at least before and after a predetermined change in the engine torque the change in engine speed is registered, and this is compared with the engine torque before and after the change in the engine torque.

11 Claims, 2 Drawing Sheets

DETERMINING AN ENGINE TORQUE ERROR DURING AN ENGINE TORQUE INTERVENTION

This claims the benefit of German Patent Application No. 10 2007 027 904.5, filed on Jun. 18, 2007 and hereby incorporated by reference herein.

The present invention relates to a method for determining an error in engine torque.

BACKGROUND

Methods are known in automotive technology for referencing and/or checking the clutch position, in which the speed of rotation and the engine torque of the drive engine are used in order to estimate the transmitting clutch torque and therefore to be able to ascertain the position of the clutch. It is assumed that the engine torque can be controlled or measured without errors. That enables the transmitted clutch torque to be determined simply, and thus allows the position of the clutch to be adjusted accordingly.

However, if there is an error in controlling the torque of the drive engine, and/or if the torque is determined erroneously, then the clutch torque is corrected accordingly, since the drive engine torque is considered error-free. This may be desirable under certain circumstances, if the engine torque error occurs uniformly and not in isolation, since in that case this error is compensated for by the clutch control unit.

However, if this error only occurs occasionally, for example only in particular situations, then the clutch can be positioned incorrectly so that this error should be detected.

SUMMARY OF THE INVENTION

An object of the invention is to provide a method that permits an error in controlling and/or detecting the engine torque to be registered.

The invention provides a method for determining an error in engine torque, wherein the change in the engine speed is registered and the engine speed is compared to the engine torque determined before and after the change in engine torque.

The speed of the engine may normally be available to the individual control and measuring units during operation of the vehicle, so that the change in engine speed can be called upon in a simple manner to determine the engine torque.

The determined engine torque can be obtained for example from the engine control system. At the same time, the determined engine torque can also be calculated and/or estimated from various engine characteristics.

When comparing the engine speed with the engine torque, both the engine speed and the engine torque can be offset with additional factors, so that a simple comparison becomes possible. However, it is also possible to compare the engine speed with the engine torque directly, using look-up tables or observers.

In a special embodiment, the change in the engine speed may be multiplied by the inertia of the engine.

The engine inertia here may be the dynamic moment of inertia of the engine, which counteracts a change in engine speed because of the geometry and the mass distribution of the engine.

Multiplication of the change in engine speed according to time multiplied by the engine inertia thus may yield the torque delivered by the engine less the torque transmitted by the clutch.

In another preferred embodiment, the transmitted clutch torque may be deducted from the engine torque before and after the predefined change.

Assuming a change of engine speed will result if the torque delivered by the engine differs from the clutch torque, the result may be:

$$(J_{Eng}\dot\omega_{Eng})_{before} - (J_{Eng}\dot\omega_{Eng})_{after} = (T_{Eng,before} + T_{Eng,Error,before}) - (T_{Cl,before} + T_{Cl,Error,before}) - ((T_{Eng,after} + T_{Eng,Error,after}) - (T_{Cl,after} + T_{Cl,Error,after}))$$

$J_{Eng}$ = moment of inertia of the engine
$\dot\omega_{Eng}$ = acceleration of the engine speed
$T_{Eng}$ = engine torque from the engine control system
$T_{Cl}$ = clutch torque from the characteristic curve
$T_{Eng,error}$ = error in the engine torque
$T_{Cl,error}$ = error in the clutch torque Aside from the sought values $T_{Eng,error,before}$ and $T_{Eng,error,after}$, $T_{Cl,error,before}$ and $T_{Cl,error,after}$ may be the only unknown values in the above equation. However, if the clutch torque changes only slightly in the time period under observation before and after the engine torque intervention, compared to the change in engine torque in the same time period, the change in clutch torque may be insignificant. Then the values $T_{Cl,error,before}$ and $T_{Eng,error,after}$ in the above equation can be eliminated. In that case the difference between $T_{Eng,error,before}$ and $T_{Eng,error,after}$ may represent the engine error being sought.

$$T_{Eng,error} = T_{Eng,error,before} - T_{Eng,error,after}$$
$$= (J_{Eng}\dot\omega_{Eng})_{before} - T_{Eng,before} + T_{Cl,before} -$$
$$((J_{Eng}\dot\omega_{Eng})_{after} - T_{Eng,after} + T_{Cl,after}$$

The difference in engine torque error determined in that way can then be taken into account when calculating the clutch torque error.

In particular, the predetermined change in the engine torque can be controlled by a control unit. An intervention of this sort in the engine torque is preferably executed by the engine control system, and in an especially preferred embodiment may be initiated by the clutch control. Thereby the engine control and the clutch control can also be a mean.

The clutch and/or engine torques are preferably averaged over a time period. That may make it possible to avoid measurement noise. The changes in speed of rotation that are measured at the engine can also be averaged. Overall, the averaging also may prevent one-time errors in measurement from having too great an effect on the determination of engine torque errors.

Furthermore, the method can also be configured so that the torque error determination may only be undertaken in the event of a torque intervention of a certain magnitude.

BRIEF DESCRIPTION OF THE DRAWINGS

The invention will be explained in further detail below on the basis of an exemplary embodiment with the help of the drawing, without causing a limitation of the scope of protection.

DETAILED DESCRIPTION

Figure 1:
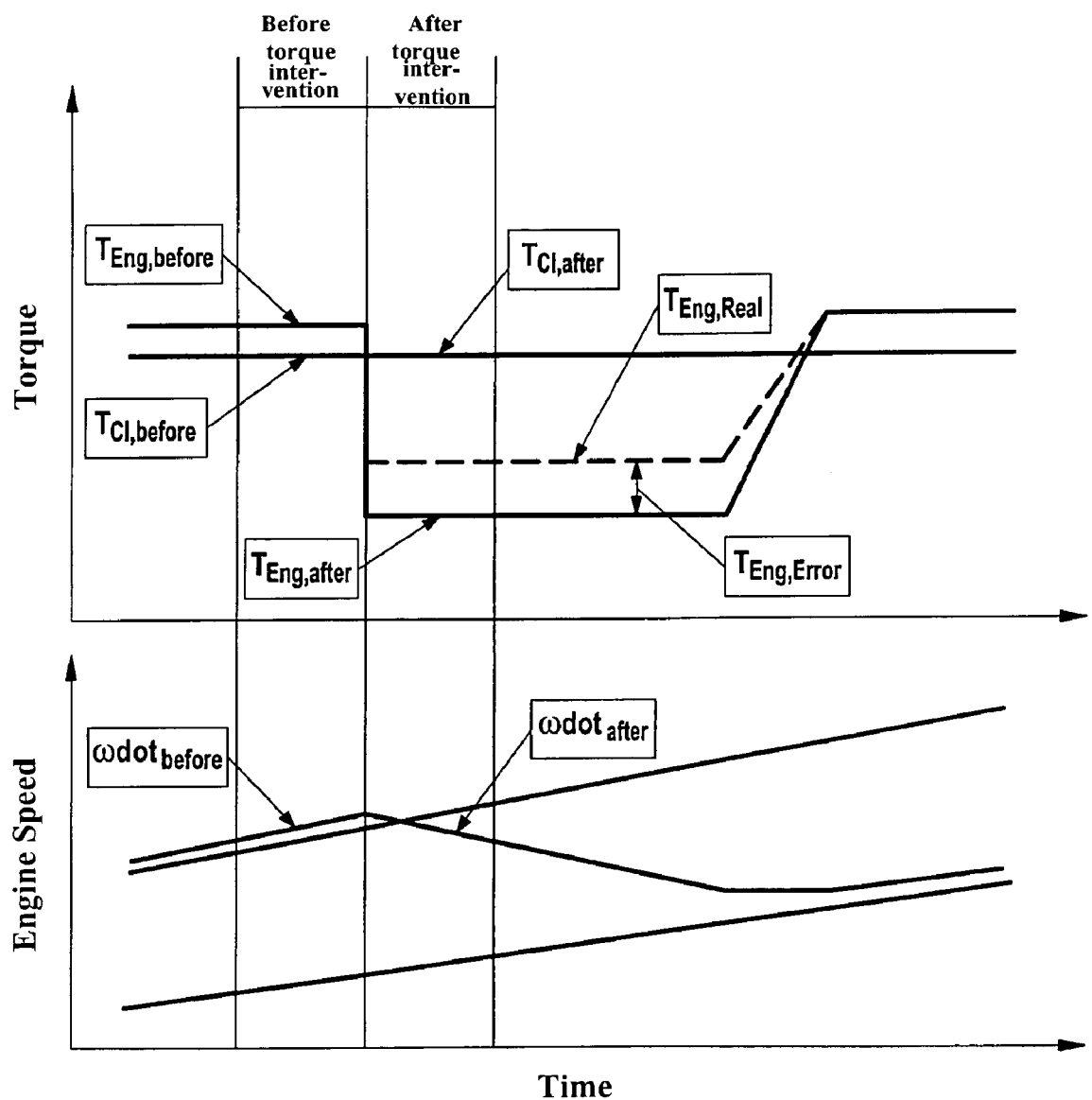
FIG. 1 shows a depiction of the torque and the engine speed during the torque intervention over time.

In a torque intervention, the torque of the drive engine is changed. In FIG. 1 this torque is reduced from $T_{Eng,before}$ to $T_{Eng,after}$. However, there is an error $T_{Eng,error}$ between the desired torque $T_{Eng,after}$ and the real torque $T_{Eng,real}$. During this torque intervention, the torque of the clutch $T_{Cl,before}$ hardly changes.

FIG. 1 also shows the dependence of the change in engine speed on the engine torque while the transmitted clutch torque remains the same.

During the torque intervention, the gradient of the engine speed over time also changes. The decrease in engine torque causes the engine speed to also decrease with time.

To determine the engine torque error in an engine torque intervention, in a first phase a large number of engine torques and clutch torques are obtained. For example, the engine torques are obtained from the engine controller, while the clutch torques are obtained from a characteristic curve from the position of the clutch actuator. If an engine torque intervention is now undertaken by the engine controller, these clutch torques and engine torques that have been obtained are averaged in order to receive reliable values for the various torques. Thereby, it is desirable for the values obtained before the engine torque intervention to have been registered as close as possible in time to the engine torque intervention.

If the engine torque intervention is undertaken by the engine controller or is detected by a sensor, and if the changed engine torque exceeds a certain threshold value, then after the engine torque intervention a second set of measurements are taken, which reflect the torque transmittable by the clutch and the torque delivered by the engine.

At the same time that the torques are being determined and stored, the change in the engine speed is registered. These values are also averaged accordingly, in order to reduce the measurement noise.

When the engine inertia is known, the engine torque error can be calculated from these values and can be taken into account when calculating the clutch torque error.

Figure 2:
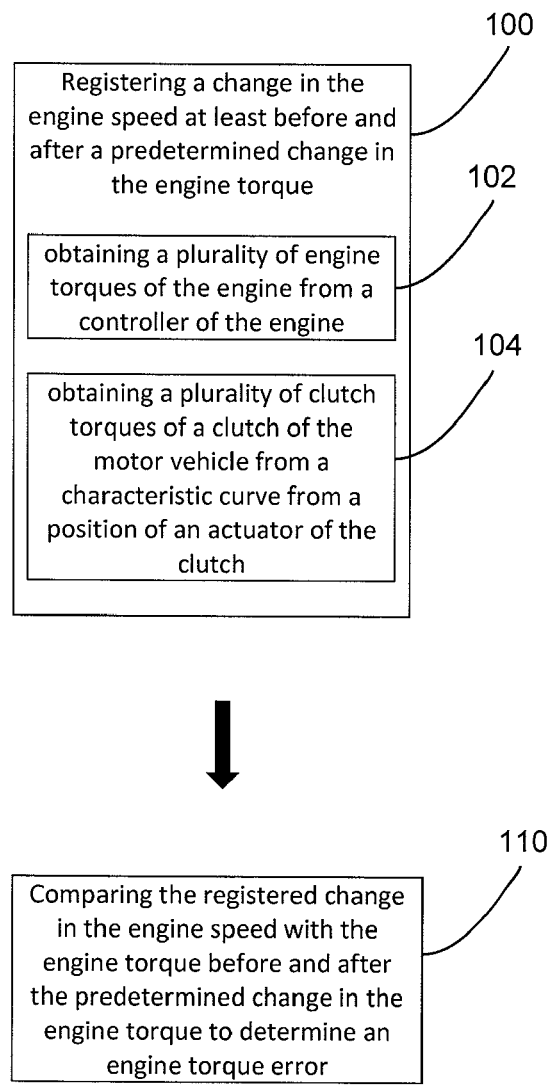
FIG. 2 shows a flow chart illustrating steps of a method in accordance with an embodiment of the present invention.

FIG. 2 shows a flow chart illustrating steps of a method for determining an error in engine torque in an engine of a motor vehicle in accordance with an embodiment of the present invention. The method includes a step 100 of registering a change in the engine speed of the engine via at least one of a measuring unit or a control unit at least before and after a predetermined change in the engine torque of the engine. Step 100 may include 102 obtaining a plurality of engine torques of the engine and 104 obtaining a plurality of clutch torques of a clutch of the motor vehicle from a characteristic curve from a position of an actuator of the clutch. The method also includes a step 110 of comparing the registered change in the engine speed of the engine with the engine torque of the engine before and after the predetermined change in the engine torque to determine an engine torque error.

What is claimed is:

1. A method for determining an error in engine torque in an engine of a motor vehicle, comprising:
   registering a change in the engine speed of the engine via at least one of a measuring unit or a control unit at least before and after a predetermined change in the engine torque of the engine; and
   comparing the registered change in the engine speed of the engine with the engine torque of the engine before and after the predetermined change in the engine torque to determine an engine torque error,
   wherein the registering step includes obtaining a plurality of engine torques of the engine and a plurality of clutch torques of a clutch of the motor vehicle; and
   wherein the plurality of engine torques are obtained from a controller of the engine; and
   wherein the plurality of clutch torques are obtained from a characteristic curve from a position of an actuator of the clutch.

2. The method as recited in claim 1 wherein the change in the engine speed is multiplied by an inertia of the engine.

3. The method as recited in claim 1 further comprising deducting a transmitted engine clutch torque from the engine torque before and after the predetermined change.

4. The method as recited in claim 1 further comprising controlling the predetermined change in the engine torque by a control unit.

5. The method as recited in claim 1 further comprising controlling the predetermined change in the engine torque by a clutch controller.

6. The method as recited in claim 1 wherein values for the engine torques and/or values for clutch torques before and after the predetermined change in the engine torque are averaged for a plurality of values.

7. The method as recited in claim 1 wherein the method is carried out when the predetermined change in the engine torque exceeds a certain threshold value.

8. The method as recited in claim 1 further comprising determining a clutch torque error from the engine torque error.

9. The method as recited in claim 1 wherein the engine torque is determined by an engine control system.

10. The method as recited in claim 1 wherein the engine torque is calculated and/or estimated from various engine characteristics of the engine.

11. The method as recited in claim 1 wherein the engine torque error is calculated according to the equation:

$$T_{Eng,error} = (J_{Eng}\omega_{Eng})_{before} - T_{Eng,before} + T_{Cl,before} - ((J_{Eng}\omega_{Eng})_{after} - T_{Eng,after} + T_{Cl,after})$$

where:
$J_{Eng}$ = moment of inertia of the engine,
$\omega_{Eng}$ = acceleration of the engine speed,
$T_{Eng}$ = engine torque from the engine control system,
$T_{Cl}$ = clutch torque from the characteristic curve,
$T_{Eng,error}$ = error in the engine torque,
$T_{Cl,error}$ = error in the clutch torque.

* * * * *